Aug. 10, 1965  O. ARNOLD  3,199,198
LEVEL SIGHTING DEVICE
Filed June 21, 1961  3 Sheets-Sheet 1

INVENTOR.
OLLEN ARNOLD.
BY
Eugene C. Knoblock
ATTORNEY

Aug. 10, 1965 O. ARNOLD 3,199,198
LEVEL SIGHTING DEVICE
Filed June 21, 1961 3 Sheets-Sheet 2

INVENTOR.
OLLEN ARNOLD
BY
Eugene C. Knoblock
ATTORNEY

Aug. 10, 1965   O. ARNOLD   3,199,198
LEVEL SIGHTING DEVICE
Filed June 21, 1961   3 Sheets-Sheet 3

INVENTOR.
OLLEN ARNOLD
BY
Eugene C. Knoblock
ATTORNEY

United States Patent Office 3,199,198
Patented Aug. 10, 1965

3,199,198
LEVEL SIGHTING DEVICE
Ollen Arnold, N. Fulton St., Cassopolis, Mich.
Filed June 21, 1961, Ser. No. 118,612
4 Claims. (Cl. 33—73)

This invention relates to improvements in level sighting devices, and more particularly to devices used by construction engineers and road engineers in laying out construction projects to insure or determine the desired levels in the construction.

The primary object of this invention is to provide a device of this character having a casing and a part in said casing suspended and positioned by gravity to indicate a true horizontal level, wherein means are provided to position and restrain the gravitationally shiftable part for protective purposes while being carried from place to place and while not in use.

A further object is to provide a device of this character having an outer casing and a gravitationally positioned indicating member therein supported in the casing by a novel universal joint type of suspension unit.

A further object is to provide a device of this character having a casing and a gravitationally positioned indicating member therein and novel means for illuminating parts of the indicator to facilitate use of the device at night or in conditions which ordinarily make the reading of measuring instruments difficult or uncertain.

A further object is to provide a device of this character having an outer casing a gravitationally positioned indicator, a suspension means for said indicator normally urged to a predetermined operative position by resilient means, and means for snubbing said indicator to predetermined fixed position in said casing in response to the operation of positioning means acting against said first named resilient positioning means.

Other objects will be apparent from the following specification.

Figure 1:
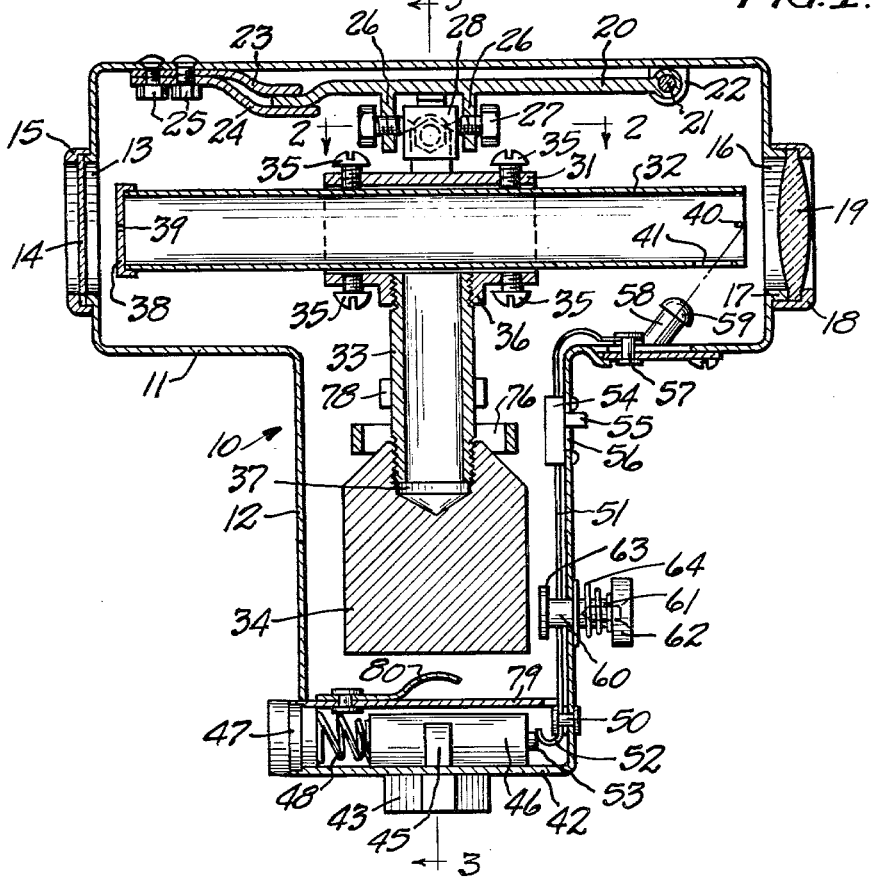
FIG. 1 is a vertical longitudinal sectional view of the device taken on line 1—1 of FIG. 3.
Figure 2:
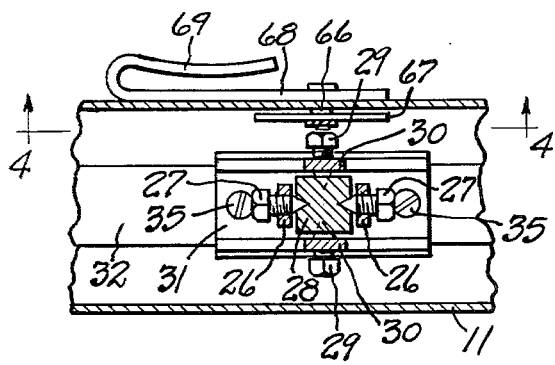
FIG. 2 is a fragmentary horizontal sectional view taken on line 2—2 of FIG. 1.

Referring to the drawings, which illustrate the preferred embodiment of the invention, the numeral 10 designates a casing or housing which is substantially of T-shape and is provided with a sighting tube part 11 and a gripping tube part 12. The sighting tube part 11 has a sighting opening 13 at one end thereof which may be spanned by a transparent member 14, if desired, which member is held in place by a retainer ring 15 screw-threaded or otherwise mounted upon a neck outlining the sighting opening 13. At its opposite end the sighting tube 11 has an axially aligned opening 16 preferably outlined by a tubular projection 17 upon which is mounted a retainer ring 18, A lens 19 spans the opening 16 and is mounted between the tube 17 and the ring 18.

Figure 5:
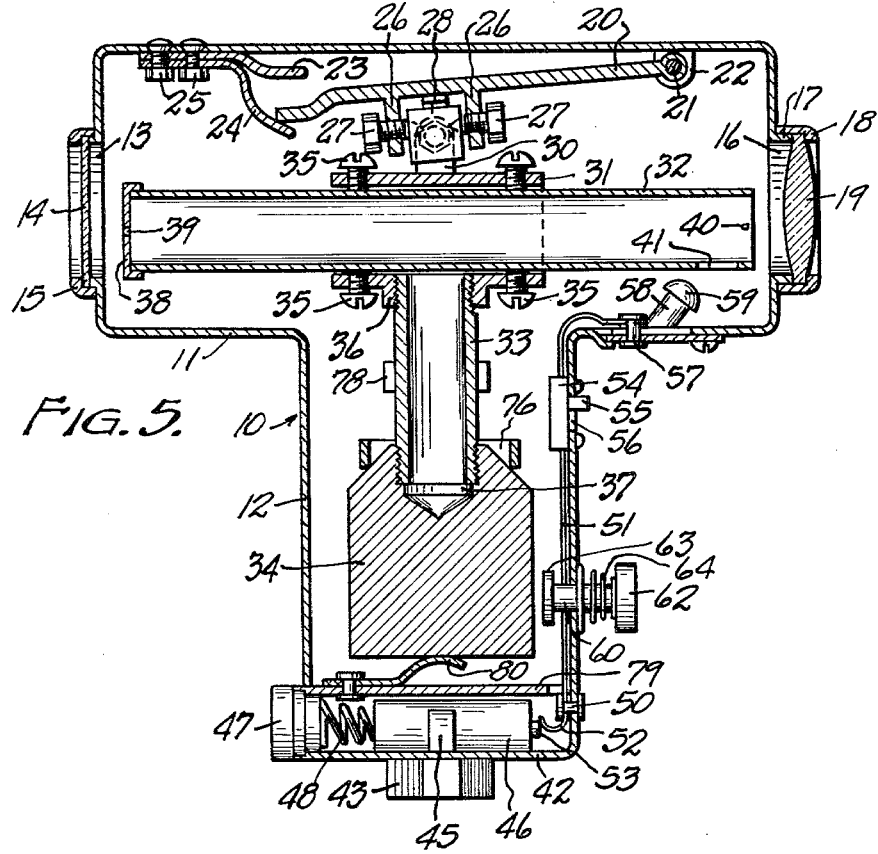
FIG. 5 is a longitudinal vertical sectional view taken on line 1—1 of FIG. 3 but illustrating the device in an inoperative position conditioned for transport.

Within the casing 10 is mounted means for suspending a gravitationally positioned indicator. As here illustrated the suspension means constitutes an elongated rigid longitudinally extending plate or arm 20 pivotally connected at 21 by pivot pin to a suitable bracket or support 22 carried by the sighting tube 11 adjacent one end thereof. The opposite or free end of the arm 20 is positioned by resilient means at a predetermined location. As here shown, said resilient arm-positioning means consists of a pair of elongated leaf springs 23 and 24 fixed to the sighting tube by securing means 25, such as bolts and nuts, and receiving the free end portion of the arm or plate 20 therebetween. The springs 23 and 24 are preferably strong enough to normally position the arm 20 at a selected location, but one thereof, such as member 24, is adapted to yield, as illustrated in FIG. 5, to permit intentional swinging of the arm 20. The springs 23 and 24 will normally be biased to grip the free end of the arm 20. At an intermediate part thereof, the arm 20 has depending therefrom a pair of spaced flanges or plate portions 26 extending transversely thereof and preferably substantially equally spaced from a projection of the center line or axis of the gripping tube portion 12.

Universal joint type suspension means for a gravitationally level indicator portion are carried by the flanges 26. As here shown, such means preferably consist of a pair of bolts or set secrws 27 having conical ends and being axially aligned and fitting in opposed sockets in a central member 28 which has a second pair of opposed sockets arranged on a common axis transverse of the sighting tube part 11 in which are received the conical tips of a pair of set screws 29 screw-threaded in spaced opposed upright arms 30. The axis of the set screws 27 is preferably located at a slightly higher level than the axis of the set screws 29. The arms or ears 30 project upwardly from an aligned tubular carrier member 31 extending lengthwise in the sighting tube portion 11 and normally preferably substantially centered therein with respect to the axes of the sighting openings 13 and 16.

Tubular carrier 31 constitutes means for supporting a gravitationally positioned level indicator. This level indicator preferably includes an elongated inner sighting tube 32, a rigid depending suspension member 33, and a weight member 34. The parts 32, 33 and 34 have a fixed relation to each other and to the tubular carrier 31. Thus the inner sighting tube 32 preferably fits with slight clearance within the tubular carrier 31 and is accurately positioned in predetermined relation within said tubular carrier by means of set screws 35 screw-threaded at spaced points in the tubular carrier 31 and bearing against the inner sighting tube 32. The upper end of the suspension member 33 is preferably screw-threaded in a tubular projection 36 at the bottom center portion of the tubular carrier 31. The lower end of the rigid suspension member is preferably screw-threaded in a socket 37 of the weight member 34.

The inner sighting tube 32 preferably has an end plate 38 fixedly mounted thereon at the end located adjacent the opening 13 of the sighting tube 11, and the plate 38 has a minute or pinhole type of opening 39 located therein centrally thereof. At the opposite end thereof, the inner sighting tube 32 mounts a centrally located horizontal cross wire 40. If desired, the inner sighting tube 32 may have an opening 41 therein preferably at its bottom at the end thereof adjacent to the cross wire 40.

The gripping tube portion 12 of the casing 10 preferably has a bottom wall 42 parallel to the axis of the sighting tube part 11 and mounting thereon centrally thereof in fixed position a nut 43 whose bottom surface is in a true flat plane truly perpendicular to the axis of the gripping tube part 12 of the casing and spaced a predetermined distance from the axis of the inner sighting tube 32 in the normal position of the parts, as illustrated in FIG. 1, at the center of said tube directly below the universal suspension thereof.

In use, the levelling instrument will be supported on a reference member, such as the top of a stake or the top of a support of selected length, in turn mounted upon, or of predetermined height with relation to, a reference stake or member. The instrument is held in upright position by the user while bearing upon this reference member and the user looks through the sight openings 13 and 16 and through the pinhole opening 39 of the inner sighting tube 32, so as to view the cross wire 40. The length of the tube 32 is sufficient that a true reading of the horizon or of a selected horizontal level can be secured by centering a distant target, such as a surveyor's measuring pole, with reference to the cross wire 40 when that cross wire appears centered with reference to the pinhole opening 39. In this way the level upon the distant measuring pole can be read and the necessary computations of level can be made.

It is frequently desirable to be able to employ an instrument of this character under conditions of partial or total darkness. This device provides means accommodating such use, assuming, of course, that suitable illumination at the target, such as a distant measuring post, is also provided. As here illustrated, the lower end of the gripping tube part 12 is provided with spring clip means 45 adapted to position and grip a storage battery 46, such as a dry cell. An opening is formed in the gripping tube portion adjacent to the clip and preferably aligned with the dry cell, within which opening is releasably mounted a closure, such as a plug. A coil spring 48 is adapted to be interposed between the plug 47 and the adjacent end of the dry cell 46.

One or more guide members 50 are carried by and within the gripping tube part and provide means for guiding longitudinal or endwise movement of a vertically extending electrical conductor 51 of rigid or substantially rigid character. The lower end portion 52 of the conductor consitutes a contactor which is bent to engage the battery terminal 53 when the conductor 51 is in one selected or operative adjustment or position of the conductor 51. A conductor guide 54 slidably mounts a finger piece 55 secured to the conductor 51 and preferably formed of non-conductive material. The finger piece 55 projects through an elongated slot 56 in the gripping tube part 12. The upper end of the conductor is arched and is anchored at a terminal 57 which in turn is electrically connected with an illuminating lamp (not shown) mounted in a housing 58 provided with a lens 59 for focusing light emitted from the lamp 58 to pass through the opening 41 and impinge upon the cross wire 40. It will be understood that suitable electrical insulation of the various electrical parts will be provided in the event that the casing is formed of metal.

It will be apparent that by the provision of the illuminating means, a user of the device can see the cross line 40 when the device is used in a condition of partial or total darkness. Thus, given operation of the lamp 58 and illumination of a distant target, such as a measuring pole, the instrument may be employed successfully under all conditions of ambient light.

Inasmuch as the level indicating assembly 32, 33, 34 is gravitationally suspended by universal suspension means to assure true horizontal relationship between opening 39 and cross wire 40 of the inner sighting tube 32 during use, which suspension means must function freely in order to be accurate, some delay may be encountered in use due to a requirement that the level indicating suspended mechanism reach a position of repose in order to permit a reading or sighting of the level to be made. The free suspension of the indicating assembly and the movement of the device to use position may entail or initiate rocking or swinging of the level-indicating assembly which is likely to continue for a substantial period of time if a weight 34 of substantial mass is employed in view of the fact that such weight acts as a pendulum. In order to expediate conditioning of the device at a static position at which a reading can be taken, the device may be provided with means for snubbing swinging of the pendulum. As here shown, such means may constitute a guide or grommet 60 carried by the gripping tube part 12 opposite the lower end of the weight 34. Within this grommet is slidable a pin 61 mounting a push button 62 at its outer end. The inner end of the pin 61 mounts a snubbing member 63 adapted to be pressed against the weight 34 to damp the oscillations thereof. A coil spring 64 encircling the pin and bearing against the push button 62 normally urges the snubbing member 63 to a position spaced from the weight 34 so as to avoid undesired restriction of swinging of the pendulum weight 34.

The use of the instrument out of doors in conjunction with layout work or survey requiring the use of other instruments and requiring activity on the part of the user presents a problem of protection of the instrument against damage as it is carried by the user. Note in this connection that the universal suspension of the level sighting internal mechanism entails the possibility or likelihood that the internal mechanism will swing and move about within the casing 10 in such a way as to produce shock and impact likely to injure or damage the instrument or to alter the adjustment and setting thereof. Therefore, it is desirable that means be provided to hold the internal sighting mechanism in a stationary position while it is being carried. One mechanism for serving this purpose is illustrated and entails the forcible movement of the shiftable internal sighting assembly against a stop at which it is held in such a manner as to restrain it against free movement in the casing 10.

Figure 4:
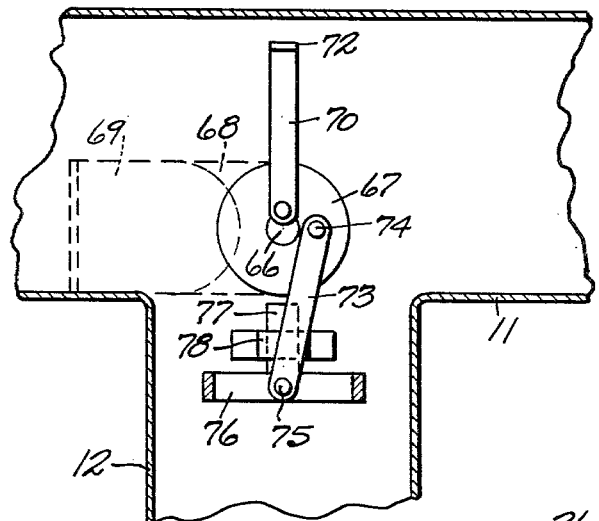
FIG. 4 is a fragmentary vertical longitudinal sectional view taken on line 4—4 of FIG. 2.
Figure 3:
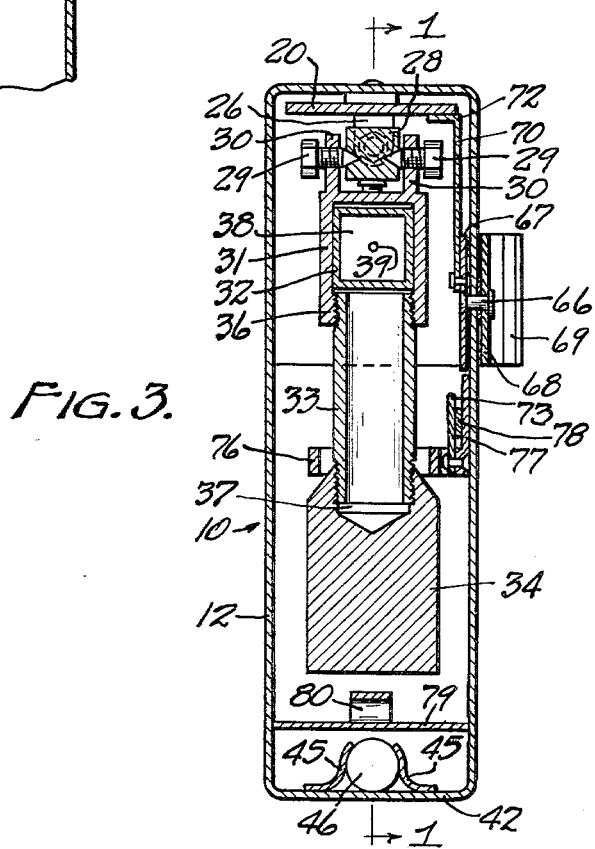
FIG. 3 is a vertical transverse sectional view of the device taken on line 3—3 of FIG. 1.
Figure 6:
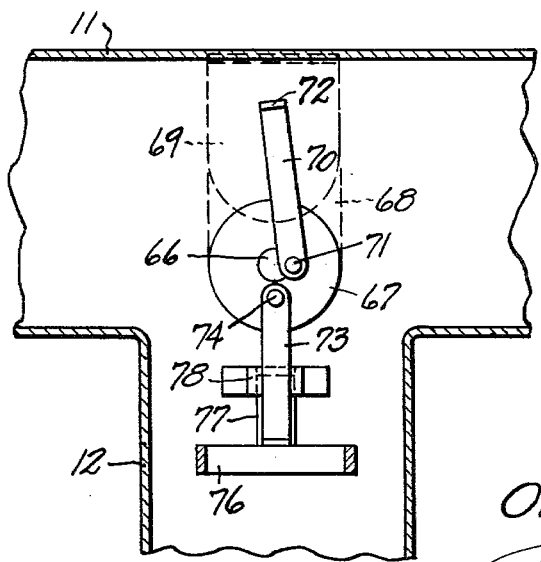
FIG. 6 is a fragmentary vertical longitudinal sectional view taken on line 4—4 of FIG. 2 and illustrating the parts in a different operative position than seen in FIG. 4.

In the embodiment selected for illustration, a pin or shaft 66 is journaled in the casing 10 adjacent the junction of the parts 11 and 12 thereof. The pin 66 mounts a disk or other member 67 within the casing and mounts a plate or member 68 externally of the casing. The plate 68 preferably terminates in a hook 69 by means of which a user may secure the instrument to his belt or other article of clothing, when said hook is positioned as illustrated in FIG. 6, as a means for convenient support and carriage of the instrument. It will be understood that the plate 68, the shaft 66 and the disk 67 will rotate in unison upon adjustment thereof. A link 70 is pivoted at 71 to the disk 67 and at its free upper end 72 engages the arm 20. By this means, when the plate 68 is swung from the FIG. 6 position to the FIG. 4 position, the link 70 is raised and serves to swing the arm 20 between the tilted inoperative position illustrated in FIG. 5 and the longitudinal operative position illustrated in FIG. 1. A second link 73 is pivoted to the disk 67 at 74 and is pivotally connected at 75 to a weight depresser ring or member 76 adapted, in its lower position, to engage and depress the weight 34 as illustrated in FIG. 5. The member 76 preferably has a projection 77 slidable relative to a guide 78 carried by the casing 12. The casing 12 is also provided with a transverse plate 79 within the lower part of the gripping tube portion 12 thereof, and plate 79 mounts a resilient member, such as a leaf spring 80, against which the weight 34 may be urged, as illustrated in FIG. 5.

It will be apparent from the foregoing that when the user desires to attach the instrument to his clothing to be carried as he moves about, the hook 68, 69 is swung to the FIG. 6 position to facilitate its use to attach the instrument to the garment. In so doing, the link 73 lowers the weight depresser 76, thereby moving the weight 34, the tube 33, and the sighting tube 32 downwardly to engage the weight 34 with the resilient member 80. Simultaneously, the arm 20 is swung downwardly from the FIG. 1 to the FIG. 5 position, thereupon lowering the same against the action of the leaf spring 24 whose tension acting upon the tilted arm 20 holds the same firmly in place. The conjoint action of the parts serves to hold the internal level sighting unit 32, 33, 34 in clamped fixed position, as seen in FIG. 5. Consequently, if the device is subjected to shock or impact, the internal level sighting mechanism is held stationary and prevented from such movement in the casing as might injure or damage the same. The device is readily conditioned for use, however, by the simple expedient of swinging the parts 68, 69 from the FIG. 6 to the FIG. 4 position in such a manner as to restore the internal sighting assembly of the device in the condition shown in FIG. 1, in which the level sighting mechanism is free to find its operative position by gravity, as explained above.

While the preferred embodiment of the invention has been illustrated and described, it will be understood that changes in the construction may be made within the scope of the appended claims without departing from the spirit of the invention.

I claim:

1. A level sighting device comprising a casing having opposed sight openings, an elongated sighting tube between and aligned with said sight openings having an end wall with a small central opening and a cross wire centered therein at the end thereof opposite said wall, a weight fixed to and suspended centrally from said tube, and means suspending said tube and weight from the upper part of said casing, said suspension means comprising a pair of longitudinally spaced transverse members carried by said casing, a pair of axially aligned pivot members carried by said transverse members and having adjacent reduced ends, a member having a set of opposed recesses receiving said reduced pivot ends and having a second set of opposed recesses arranged perpendicularly to said first set of recesses, a tube carrier having a pair of upwardly projecting ears spaced transversely of said tube, and a second pair of axially aligned pivot members carried by said ears and having reduced ends fitting in the recesses of the second set.

2. A level sighting device comprising a casing having opposed sight openings, an elongated sighting tube in said casing aligned with said sight openings and having an end wall with a small central opening and a cross wire centered therein at the end thereof opposite said wall, a weight fixed to and suspended centrally from said tube, and means suspending said tube and weight from the upper part of said casing, said suspension means comprising a spring urged member shiftable in said casing, a universal joint connecting said tube to said spring urged member, and means for shifting the spring urged member, said tube and said weight to fixed position in said casing.

3. A level sighting device comprising a casing having opposed sight openings, an elongated sighting tube in said casing aligned with said sight openings and having an end wall with a small central opening and a cross wire centrally spanning the end of said tube opposite said wall, a weight depending from and fixedly connected to said tube, a universal joint suspension for said tube and weight including a member shiftable in said casing, resilient means positioning said member, and means for shifting said member to position said tube and weight in clamped stationary position in said casing.

4. A level sighting device comprising a casing having opposed sight openings, an elongated sighting tube in said casing aligned with said sight openings and having an end wall with a small central opening and a cross wire centrally spanning the end of said tube opposite said wall, a weight depending from and fixedly connected to said tube, a universal joint suspension for said tube and weight including a member shiftable in said casing, resilient means positioning said member, means for shifting said member, tube and weight in said housing, and a resilient abutment in said casing against which said last named means urges said weight to substantially restrain movement of said weight and tube in said casing.

References Cited by the Examiner

UNITED STATES PATENTS

| 754,723 | 3/04 | Townsend | 33—73 |
| 1,014,519 | 1/12 | Roake | 33—73 |
| 1,230,258 | 6/17 | Wood | 33—220 |
| 2,171,571 | 9/39 | Karnes | 33—50.5 X |
| 2,645,855 | 7/53 | Ivy | 33—50 |

FOREIGN PATENTS

| 86,843 | 5/96 | Germany. |
| 148,092 | 2/02 | Germany. |

ISAAC LISANN, *Primary Examiner.*

LEO SMILOW, *Examiner.*